United States Patent Office 3,329,697
Patented July 4, 1967

3,329,697
PROCESS FOR THE PRODUCTION OF ORGANIC PHOSPHORUS HALO-ALUMINIUM HALIDE COMPLEXES
Reinhard Schliebs, Cologne-Stammheim, Germany, assignor to Farbenfabriken Bayer Aktiengesellschaft, Leverkusen, Germany, a German corporation
No Drawing. Filed Sept. 23, 1963, Ser. No. 310,912
Claims priority, application Germany, Oct. 13, 1962, F 38,030
6 Claims. (Cl. 260—448)

The invention relates to a process for the production of alkyl halophosphine-aluminium halide complexes by reacting a phosphorus halide, an alkyl halide and an aluminium halide in a molten inorganic medium.

It is known from the "Journal of the Chemical Society," 1952, pages 3437 to 3445, that the solid complexes of the general formula $[RPCl_3]^+[AlCl_4]^-$ in which R represents alkyl, can be obtained by combining 1 mol of each of phosphorus trihalide, aluminium halide and alkyl halide.

As these complexes melt under decomposition at about 200° C., the reaction or phosphorus trihalide, aluminium halide and alkyl halide has to be carried out at a lower temperature. The reaction mixture is fluid in the beginning but solidifies before the reaction is completed as the melting point is raised with the growing content of complex compound. Therefore, is is difficult to produce these complexes in larger amounts. If it is intended to reduce the complex formed with aluminium to yield an alkyl-phosphorus halide this reaction has to be carried out in a solvent, e.g. acetonitrile or benzonitrile. On the other hand, the complexes itself may not be produced in nitriles as solvents. So, hitherto no solvent was known which is equally suited for producing and for reducing the complexes.

One expedient is the use of the liquid complexes of the general formula $[RPHal_3]^+[Al_2Hal_7]^-$, in which R=methyl or ethyl, it being possible to produce this complex by combining 1 mol of phosphorus trichloride, 1 mol of alkyl chloride and 2 mols of aluminium chloride. These complexes can be conveniently reduced with aluminium, as indicated in German Patent No. 1,119,860. It is also possible to recover a substantial part of the aluminium chloride (German Patent No. 1,119,862).

A process has now been found for the production of alkyl halophosphine-aluminium halide complexes of the formula $[RXPHal_2]^+[Al_nHal_y]^-$, wherein R represents a straight-chain of branched alkyl radical preferably having 1 to 20 carbon atoms or a cycloalkyl radical, X=chlorine or bromine or R, $n=1$ and 2, $y=4$ and 7 and Hal=chlorine and bromine, in which a phosphorus halide is reacted with an alkyl or cycloalkyl halide in a solution of aluminium halide in alkali metal tetrahaloaluminates at or above the melting temperature of these solutions. As phosphorus halide, it is for example possible to employ phosphorus trichloride, phosphorus tribromide, alkyl phosphorus dichloride and –bromide or cycloalkyl phosphorus dichloride and –bromide, complexes of the formula $[RPHal_3]^+[AlHal_4]^-$ and $[RPHal_3]^+[Al_2Hal_7]^-$ being formed from phosphorus trihalide and the corresponding organic halide, while complexes of the formula $$[RR'PHal_2]^+[AlHal_4]^-$$

and complexes of the formula $[RR'PHal_2]^+[Al_2Hal_7]^-$ are formed from alkyl or cycloalkyl phosphorus dihalides and the corresponding organic halides.

Suitable alkyl and cycloalkyl phosphorus dihalides are: methyl-, ethyl-, propyl-, isopropyl-, butyl-, dodecyl-, cyclopentyl-, and cyclohexyl-phosphorus dichlorides and dibromides.

The following compounds can for example be used as organic halides: methyl chloride, ethyl chloride, propyl chloride, isopropyl chloride, butyl chlodies, dodecyl chlorides, cyclopentyl chloride and cyclohexyl chloride, and the corresponding bromides. As alkali metal tetrahaloaluminate, it is advantageous to use sodium tetrachloro- or -bromoaluminate. Mixtures of tetrahaloaluminates of different alkali metals such as for example a mixture of sodium tetrachloroaluminate and lithium tetrachloroaluminate may also be employed if desired. It is expedient in this case to keep the ratio between alkali metal tetrahaloaluminate and complex in the region of about 1:1. The process is carried out by initially providing a molten alkali metal tetrahaloaluminate, more especially sodium tetrahaloaluminate, dissolving the necessary quantity of aluminium halide in the haloaluminate and adding phosphorus trihalide or phosphorus alkyl halide and the alkyl chloride dropwise to the mixture, it being advantageous for these latter to be mixed beforehand. This process is carried out at temperatures of 30 to 300° C., preferably at 40 to 250° C. The mixture of alkyl halide and phosphorus trihalide, when added dropwise, is smoothly and quickly absorbed. After all the mixture has been introduced dropwise, a melt is formed which can be easily reduced under the known conditions. The melts have complete thermal stability at their melting temperature. They can be dispensed using the known dispensing assemblies or dispensing pumps or rotameters.

The complexes are used as intermediate products for the production of alkyl-phosphorus compounds, which are important for pest-control purposes.

Example 1

190 g. of sodium tetrachloraluminate are mixed and melted with 133.4 g. of aluminium chloride (molar ratio 1:1). The melt starts to solidify at 116°. To this mixture, which is disposed in a stirrer-type vessel with a dropping funnel and a Dry Ice refluxe condenser, there is added dropwise a mixture of 138 g. of phosphorus trichloride and 65 g. of ethyl chloride, the addition being effected quickly enough to result in moderate reflux. On completing the introduction, a homogeneous melt is formed, which starts to solidify at about 108°.

For reducing the complex which is formed, 18 g. of aluminium and 160 g. of common salt are added and, by reaction at 170–180°, there are obtained 100 g. of ethyl phosphine dichloride (76.5% yield). The sodium tetrachloraluminate melt obtained as non-volatile residue is then used again.

Example 2

A mixture of 122 g. of phosphorus trichloride and 105 g. of cyclohexylchloride is quickly added dropwise to a melt of 170 g. of sodium tetrachloraluminate with 118 g. of aluminium chloride (molar ratio 1:1). In an exothermic reaction (the temperature of 116° is maintained by external cooling and is finally lowered to 110°), the mixture is absorbed. Only a little hydrochloric acid is split off from the cyclohexylchloride. The resulting mixture of sodium tetrachloraluminate and the cyclohexyltetrachlorophosphine-aluminium chloride complex starts to solidify at 44–46°.

Example 3

To a mixture of 1 mol. of lithium tetrachloraluminate and 1 mol. of sodium tetrachloraluminate (which starts to solidify at about 108°), there are added 2 mols. of aluminium chloride. To the mixture which is obtained there is added a mixture of 2 mols. of isopropyl chloride and 2 mols. of phosphorus trichloride. The melt which forms is a mixture of isopropyltetrachlorophosphine-aluminium chloride complex with sodium-lithium tetrachloroaluminate and starts to solidify at about 76°.

If an attempt is made to melt the isopropyltetrachlorophosphine-aluminium chloride complex obtained in known manner, it is decomposed with evolution of gas.

*Example 4*

1 mol. of aluminium chloride was added to 4 mols. of molten sodium tetrachloraluminate and the ethyl tetrachlorophosphine-aluminium chloride complex was produced by dropwise addition of a mixture of 1 mol. of phosphorus trichloride and 1 mol. of ethyl chloride. The mixture obtained started to solidify at 116–117° and could readily be reduced with aluminium under the known conditions.

*Example 5*

A mixture of 1 mol. of ethyl dichlorophosphine with 1 mol. of ethyl chloride was added dropwise to a solution of 1 mol. of aluminium chloride in 1 mol. of molten sodium tetrachloroaluminate. The diethyl trichlorophosphine-aluminium chloride complex is formed in a strongly exothermic reaction. The mixture which forms starts to solidify from 76°.

*Example 6*

A mixture of 137 g. of phosphorus trichloride and 154 g. of carbon tetrachloride was added dropwise at 110–115° to a melt of 200 g. of sodium tetrachloroaluminate and 134 g. of aluminium chloride. The trichloromethyl-tetrachlorophosphine-aluminium chloride complex was formed. The melt obtained started to solidify from about 132°.

*Example 7*

0.282 mol of sodium bromide is added to 0.564 mole of aluminium bromide and the mixture was molten. A mixture of 0.282 mol of alkyl bromide (i.e., ethyl bromide) and 0.282 mol of phosphorus tribromide is added dropwise at a temperature of 125 to 150° C. The mixture of the complex $[C_2H_5PBr_3]^+[AlBr_4]^-$ and sodium aluminium bromide thus obtained solidifies at about 135° C.

The solution of the complex $[CH_3PBr_3]^+[AlBr_4]^-$ obtained in the same way solidifies at about 145° C. These solutions may be reduced to the corresponding alkyl phosphorus dibromides by adding aluminium and sodium bromide and reacting at 180 to 200° C.

I claim:

1. Process for the production of a homogeneous melt comprising alkali tetrahaloaluminate and alkyl halophosphine-aluminium halide complexes of the formula $$[RXPHal_2]^+[Al_xHal_y]^-$$

wherein R is a member of the group consisting of an alkyl radical having 1 to 20 carbon atoms and a cycloalkyl radical having 5 to 6 carbon atoms, X is a member of the group consisting of chlorine, bromine, an alkyl radical having 1 to 20 carbon atoms and a cycloalkyl radical having 5 to 6 carbon atoms, Hal is a member of the group consisting of chlorine and bromine, x represents the numbers 1 and 2 and y represents the numbers 4 and 7, which comprises reacting a phosphorus halide selected from the group consisting of phosphorus trichloride, phosphorus tribromide an alkyl-phosphorus dichloride, an alkyl-phosphorus dibromide, a cycloalkyl-phosphorus dichloride and a cycloalkyl-phosphorus dibromide and an organic halide selected from the group consisting of an alkyl chloride, a cycloalkyl chloride, an alkylbromide and a cycloalkyl bromide with a solution of an aluminium halide in an alkali tetrahaloaluminate at a temperature of 30 to 300° C.

2. Process for the production of a homogeneous melt comprising alkali tetrachloroaluminate and alkyl chlorophosphine-aluminium chloride complexes of the formula $$[RXPCl_2]^+[Al_xCl_y]^-$$

wherein R is a member of the group consisting of an alkyl radical having 1 to 20 carbon atoms and a cycloalkyl radical having 5 to 6 carbon atoms, X is a member of the group consisting of chlorine, an alkyl radical having 1 to 20 carbon atoms and a cycloalkyl radical having 5 to 6 carbon atoms, x represents the numbers 1 and 2 and y represents the numbers 4 and 7, which comprises reacting a phosphorus chloride selected from the group consisting of phosphorus trichloride, an alkyl-phosphorus dichloride, a cycloalkyl-phosphorus dichloride and an organic chloride selected from the group consisting of an alkyl chloride, a cycloalkyl chloride with a solution of an aluminium chloride in an alkali tetrachloroaluminate at a temperature of 30 to 300° C.

3. Process for production of a homogeneous melt comprising sodium tetrachloroaluminate and a complex of the formula $$[C_2H_5PCl_3]^+[AlCl_4]^-$$

which comprises reacting phosphorus trichloride and ethyl chloride with a solution of aluminium chloride in sodium tetrachloroaluminate at a temperature of about 120° C.

4. Process for the production of a homogeneous melt comprising sodium tetrachloroaluminate and a complex of the formula $$[C_6H_{11}PCl_3]^+[AlCl_4]^-$$

which comprises reacting phosphorus trichloride and cyclohexyl chloride with a solution of aluminium chloride in sodium tetrachloroaluminate at a temperature of about 120° C.

5. Process for the production of a homogeneous melt comprising sodium tetrachloroaluminate and a complex of the formula $$[(C_2H_5)_2PCl_2]^+[AlCl_4]^-$$

which comprises reacting ethyl dichlorophosphine and ethyl chloride with a solution of aluminium chloride in sodium tetrachloroaluminate at a temperature of about 120° C.

6. Process for the production of a homogeneous melt comprising sodium tetrabromoaluminate and a complex of the formula $$[C_2H_5PBr_3]^+[AlBr_4]^-$$

which comprises reacting phosphorus tribromide and ethyl bromide with a solution of aluminium bromide in sodium tetrabromoaluminate at a temperature of 125 to 150° C.

No references cited.

TOBIAS E. LEVOW, *Primary Examiner.*

H. M. SNEED, *Assistant Examiner.*